United States Patent
Pryor et al.

(10) Patent No.: US 7,991,525 B2
(45) Date of Patent: Aug. 2, 2011

(54) IN-VEHICLE ALERT OF CLOUD POINT IN ENGINE DIESEL FUEL

(75) Inventors: Bryan K. Pryor, Farmington, MI (US); William C. Albertson, Clinton Township, MI (US); Mike M. Mc Donald, Macomb, MI (US); Jeffrey D. Lines, Plymouth, MI (US)

(73) Assignees: GM Global Technology Operations LLC, Detroit, MI (US); General Motors LLC, Detroit, MI (US)

( * ) Notice: Subject to any disclaimer, the term of this patent is extended or adjusted under 35 U.S.C. 154(b) by 533 days.

(21) Appl. No.: 12/189,117

(22) Filed: Aug. 8, 2008

(65) Prior Publication Data

US 2010/0033372 A1 Feb. 11, 2010

(51) Int. Cl.
*G01C 21/34* (2006.01)
(52) U.S. Cl. .............. 701/29; 701/31; 701/33; 701/35
(58) Field of Classification Search .............. 701/29, 701/31, 32, 33, 35, 99, 102, 207, 208, 213; 374/20, 45, 144; 73/61.62, 64.44, 64.43, 73/64.45; 342/357.09–357.13
See application file for complete search history.

(56) References Cited

U.S. PATENT DOCUMENTS

| 5,887,572 A * | 3/1999 | Channing | 123/514 |
| 6,827,484 B2 * | 12/2004 | Tsang et al. | 374/20 |
| 6,966,692 B2 | 11/2005 | Tsang et al. | |

OTHER PUBLICATIONS

U.S. Appl. No. 12/173,990, filed Jul. 16, 2008, Pryor et al.
U.S. Appl. No. 12/174,056, filed Jul. 16, 2008, Pryor et al.

* cited by examiner

*Primary Examiner* — Richard M. Camby
(74) *Attorney, Agent, or Firm* — Dierker & Associates, P.C.

(57) ABSTRACT

The disclosure relates to a method for receiving in-vehicle information regarding diesel fuel cloud point condition. The method includes establishing communication between a telematics unit in a vehicle and i) a global positioning system device, ii) a call center including a database, and iii) a cloud point monitoring device in the vehicle. The telematics unit receives from at least one of i, ii, or iii, information pertaining to vehicle location, cloud point, and ambient temperature. The telematics unit determines from the information whether fuel in a fuel system of the vehicle is reaching cloud point or can reach cloud point within a given time period. The telematics unit then transmits an in-vehicle alert when the fuel in the vehicle fuel system is reaching cloud point or can reach cloud point within a given time period. The disclosure also relates to a system for performing the method.

13 Claims, 4 Drawing Sheets

IN-VEHICLE ALERT OF CLOUD POINT IN ENGINE DIESEL FUEL

TECHNICAL FIELD

The present disclosure relates generally to an in-vehicle alert of cloud point of diesel fuel.

BACKGROUND

Diesel fuel is the most common fuel for heavy-duty trucks. Due to its high-energy content and thus better fuel economy, diesel fuel is also widely used by passenger cars in many countries. Due, at least in part, to its economic and environmental benefits, diesel fuel is becoming increasingly more popular for passenger cars, SUV's and trucks.

Diesel engines become inoperable when the fuel temperature falls below the cloud point of the fuel, due to wax crystals forming in the fuel and plugging the fuel tank filter. The formation of wax crystals in the diesel fuel is commonly referred to as gelling. Methods for mitigating the formation of wax crystals in diesel fuel include blending, incorporating cold-flow additives, using fuel heaters and engine idling.

Cloud point and related cold-flow properties of diesel fuels is information that is not traditionally provided to the consumer. Such information may allow one to minimize or completely avoid drawbacks often associated with the above-mentioned methods. Devices for determining cloud point of diesel fuel in a vehicle fuel system are usually designed with the professional driver of diesel-powered rigs in mind. Though also usable in average consumer vehicles, these devices generally require some technical know how to install, utilize and maintain. Data collection from the device can demand active user attention and knowledge of how the device works. As such, the average non-professional user of a diesel-powered vehicle does not have access to accurate, on-the-spot information about how temperatures are affecting the diesel fuel in the vehicle's fuel system. This may result in the user taking less than effective or even ineffective preventive measures that may be quite expensive and result in a waste of fuel.

SUMMARY

A method for receiving in-vehicle information regarding diesel fuel cloud point condition is disclosed. The method includes establishing communication between a telematics unit in a vehicle and i) a global positioning system device, ii) a call center including a database, and iii) a cloud point monitoring device in the engine. The telematics unit receives from at least one of i, ii, or iii, information pertaining to vehicle location, cloud point, and ambient temperature. The method further includes determining from the information whether fuel in a fuel system of the vehicle is reaching cloud point or can reach cloud point within a given time period, and transmitting an in-vehicle alert when the fuel in the vehicle fuel system is reaching cloud point or can reach cloud point within a given time period. A system for performing the method is also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The method and system disclosed herein advantageously allow users of diesel fueled vehicles to be alerted beforehand of impending extreme weather conditions, specifically drops in temperature that, without preventive measures, may cause the diesel fuel in the vehicle's fuel system to reach cloud point. Fuel reaching cloud point may result in temporary engine dysfunction. The method and system disclosed herein advantageously alert a vehicle user prior to the fuel reaching cloud point. For example, the method and system disclosed herein alert an in-vehicle user that the vehicle's fuel may develop wax crystals within a given time frame, and therefore the vehicle may be subject to operational failure because fuel may not be able to flow into the engine.

In examples of the method disclosed herein, the telematics unit is capable of determining whether the fuel is reaching cloud point with minimal or no interaction with a call center and/or a vehicle user.

It is to be understood that, as used herein, the term "user" includes vehicle owners, operators, and/or passengers.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. As such, indirect communication may include communication between two components with additional component(s) located therebetween.

Figure 1:
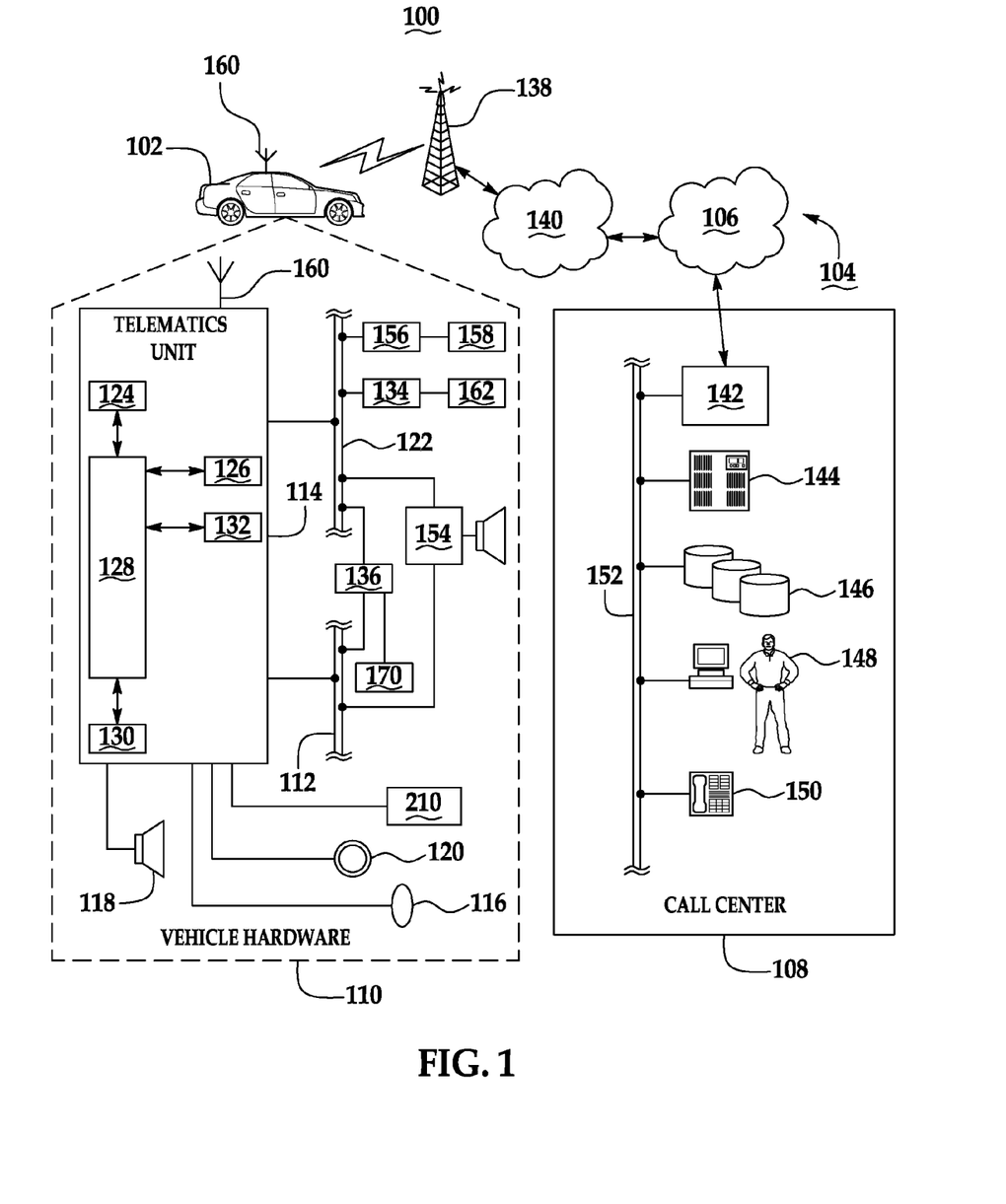
FIG. 1 is a schematic diagram depicting a system for receiving and responding to information about diesel fuel cloud point in the vehicle fuel system.

Referring now to FIG. 1, a non-limiting example of a system 100 for implementing the method(s) disclosed herein is depicted. Specifically, a schematic diagram of the system 100 is depicted for receiving information regarding diesel fuel cloud point condition in a vehicle fuel system (not shown).

More specifically, FIG. 1 depicts an example of a communication system 100. This system includes a vehicle 102, a wireless carrier system 104, a land network 106 and the call center 108. The overall architecture, setup and operation, as well as the individual components of the system 100 shown in FIG. 1 are generally known in the art. Thus, the following paragraphs provide a brief overview of one such exemplary information system 100. It is to be understood, however, that additional components and/or other systems not shown here could employ the method(s) disclosed herein.

The vehicle 102 is a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1, including a telematics unit 114, a microphone 116, a speaker 118 and buttons and/or controls 120 connected to the telematics unit 114. Generally, these hardware 110 components enable a user to communicate with the telematics unit 114 and any other system 100 components in communication with the telematics unit 114.

Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications. The vehicle bus 122 enables the vehicle 102 to send and receive signals from the telematics unit 114 to various units of equipment and systems both outside the vehicle 102 and within the vehicle 102 to perform various functions, such as unlocking a door, executing personal comfort settings, and/or the like.

The telematics unit 114 is an onboard device that provides a variety of services both individually and through its communication with the call center 108. The telematics unit 114 generally includes an electronic processing device 128, one or more types of electronic memory/database 130, a cellular chipset/component 124, a wireless modem 126, a dual antenna 160 and a navigation unit containing a GPS chipset/component 132. In one example, the wireless modem 126 includes a computer program and/or set of software routines executing within processing device 128. It is to be understood that telematics unit 114 may include additional components (e.g., a real-time clock, a short-range wireless communication network (e.g., a Bluetooth® unit), and/or the like, and/or combinations thereof) and functionality as desired for a particular end use.

The electronic processing device 128 may be a micro controller, a controller, a microprocessor, a host processor, and/or a vehicle communications processor. In another example, electronic processing device 128 may be an application specific integrated circuit (ASIC). Alternatively, electronic processing device 128 may be a processor working in conjunction with a central processing unit (CPU) performing the function of a general-purpose processor.

The navigation unit containing a GPS chipset/component 132 may include a Global Position System (GPS) receiver, a radio triangulation system, a dead reckoning position system, and/or combinations thereof. In particular, a GPS receiver provides accurate time and latitude and longitude coordinates of the vehicle 102 responsive to a GPS broadcast signal received from a GPS satellite constellation (not shown).

The cellular chipset/component 124 may be an analog, digital, dual-mode, dual-band, multi-mode and/or multi-band cellular phone.

Several examples of the many services provided by the telematics unit 114 include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle; and information/entertainment-related services where music, Web pages, movies, television programs, video games and/or other content is downloaded by an infotainment center/system 136 operatively connected to the telematics unit 114 via vehicle bus 122 and audio bus 112. In one example, downloaded content is stored for current or later playback.

The above-listed services are by no means an exhaustive list of all the capabilities of the telematics unit 114, but are simply an illustration of some of the services that the telematics unit 114 is capable of offering.

Vehicle communications preferably use radio transmissions to establish a voice channel with a wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error may be used. A dual mode antenna 160 services the GPS chipset/component 132 and the cellular chipset/component 124.

A microphone 116 provides the operator of the vehicle 102 or other vehicle occupant with a means for inputting verbal or other auditory commands, and may be equipped with an embedded voice processing unit utilizing a human/machine interface (HMI) technology known in the art. Conversely, a speaker 118 provides verbal output to the vehicle occupants and may be either a stand-alone speaker specifically dedicated for use with the telematics unit 114 or may be part of a vehicle audio component 154. In either event, the microphone 116 and speaker 118 enable the vehicle hardware 110 and the call center 108 to communicate with the occupants of the vehicle 102 through audible speech. The vehicle hardware 110 also includes one or more buttons or controls 120 for enabling a vehicle occupant to activate or engage one or more of the vehicle hardware components 110. For example, one of the buttons 120 may be an electronic push button used to initiate voice communication with the call center 108 (whether it be a live advisor 148 or an automated call response system (not shown)). In another example, one of the buttons 120 may be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. The audio component 154 may contain a speaker system, or may utilize a speaker 118 via arbitration on the vehicle bus 122 and/or audio bus 112.

In a non-limiting example, the vehicle hardware 110 also includes a display 170, which is part of a driver information center (not shown). The driver information center display 170 may be operatively connected to the telematics unit 114 directly, or may be part of the audio component 154 (e.g., an in-vehicle radio) or infotainment center 136. Non-limiting examples of the display 170 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

The vehicle crash and/or collision detection sensor interface 156 is/are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and/or the like. Example sensor interface modules 134 include power train control, climate control, and body control, to name but a few.

In an example, the wireless carrier system 104 is a cellular telephone system or any other suitable wireless system that transmits signals between the vehicle hardware 110 and land network 106. According to an example, the wireless carrier system 104 includes one or more cell towers 138, base stations and/or mobile switching centers (MSCs) 140, as well as any other networking components that may be needed to connect the wireless system 104 with the land network 106. It is to be understood that various cell tower/base station/MSC arrangements are possible and could be used with wireless system 104. As non-limiting examples, a base station and a cell tower could be co-located at the same site or they could be remotely located, and a single base station could be coupled to various cell towers or various base stations could be coupled with a single MSC, to name but a few of the possible arrangements. A speech codec or vocoder may also be incorporated in one or more of the base stations, but depending on the particular architecture of the wireless network, it could be incorporated within a Mobile Switching Center or some other network components as well.

The land network 106 may be a conventional land-based telecommunications network that is connected to one or more landline telephones, and connects the wireless carrier network 104 to a call center 108. For example, the land network 106 may include a public switched telephone network (PSTN) and/or an Internet protocol (IP) network. It is to be understood that one or more segments of the land network 106 may be implemented in the form of a standard wired network, a fiber or other optical network, a cable network, other wireless networks such as wireless local networks (WLANs) or networks providing broadband wireless access (BWA), or any combination thereof.

The call center 108 is designed to provide the vehicle hardware 110 with a number of different system back-end functions and, according to the example shown here, generally includes one or more switches 142, servers 144, databases 146, advisors 148, as well as a variety of other telecommunication and computer equipment 150 that is known to those skilled in the art. These various call center components are coupled to one another via a network connection or bus 152, such as the one previously described in connection with the vehicle hardware 110.

The advisor 148 may be a person or an automaton. Furthermore, the live advisor may be physically present at the call center 108 or may be located remote from the call center 108 while communicating therethrough.

Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, the database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

The call center 108 may also interact with a service provider (not shown) to provide service(s) to the user. It is to be understood that, although the service provider may be located at the call center 108, the call center 108 is a separate and distinct entity from the service provider. In an example, the service provider is located remote from the call center 108. A service provider provides the user with telephone and/or Internet services. In an example, the service provider is a wireless carrier (such as, for example, Verizon Wireless®, AT&T®, Sprint®, etc.).

The infotainment systems 136 described herein are systems that may be installed and used inside vehicles such as, without limitation, cars, trucks, motorcycles, recreational vehicles, boats and airplanes. These systems 136 can also be used as stationary or portable systems in other venues such as the following non-limiting examples: the home, hotels and motels, airports and other transportation waiting areas including mass transit stops, bars and restaurants, the workplace, commercial airlines, trains and buses, and in any other venue where people listen to radio broadcasts.

Figure 2:
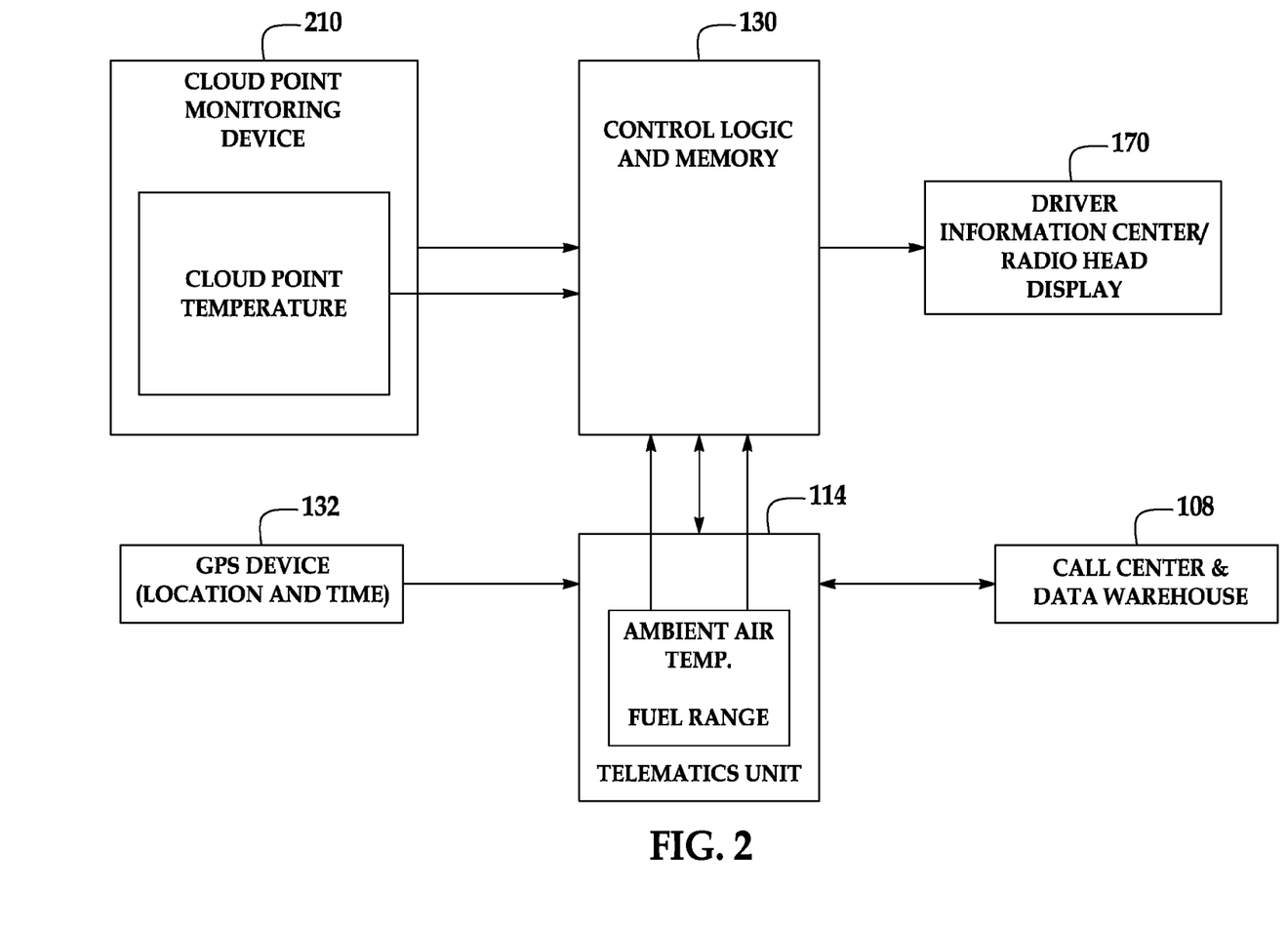
FIG. 2 is a block diagram showing the relationship between the telematics unit and various elements of the system, including the cloud point monitoring device.

FIG. 2 shows a block diagram illustrating how the telematics unit 114, via the control logic and memory 130, communicates with the cloud point monitoring device 210. The block diagram also shows the communication links between the telematics unit 114 and the GPS device 132, the call center 108, and the driver information center display 170. Via one or more of the respective communications shown in FIG. 2, the telematics unit 114 is capable of communicating information related to cloud point to a vehicle user.

More specifically, as shown in FIG. 2, the telematics unit 114 receives information from one or more of the global positioning system device 132 and the cloud point monitoring device 210. The telematics unit 114 may also receive information from the call center 108, for example, when the information (e.g., ambient temperature) stored in the telematics unit database/memory 130 is not current. The vehicle bus 122 (e.g., a CAN bus) may also provide the ambient temperature data and the fuel range data (which it receives from one or more sensors 158) to the telematics unit 114. From such information, the telematics unit 114 is able to determine when the fuel in the fuel system is reaching cloud point or has the potential to reach cloud point within a given time period. In response to this determination, the telematics unit 114 transmits an alarm to an in-vehicle user. In an example, the vehicle user is alerted by a display of the driver information center 170 operatively connected to the telematics unit 114 or a blinking light on the vehicle dash.

Figure 3:
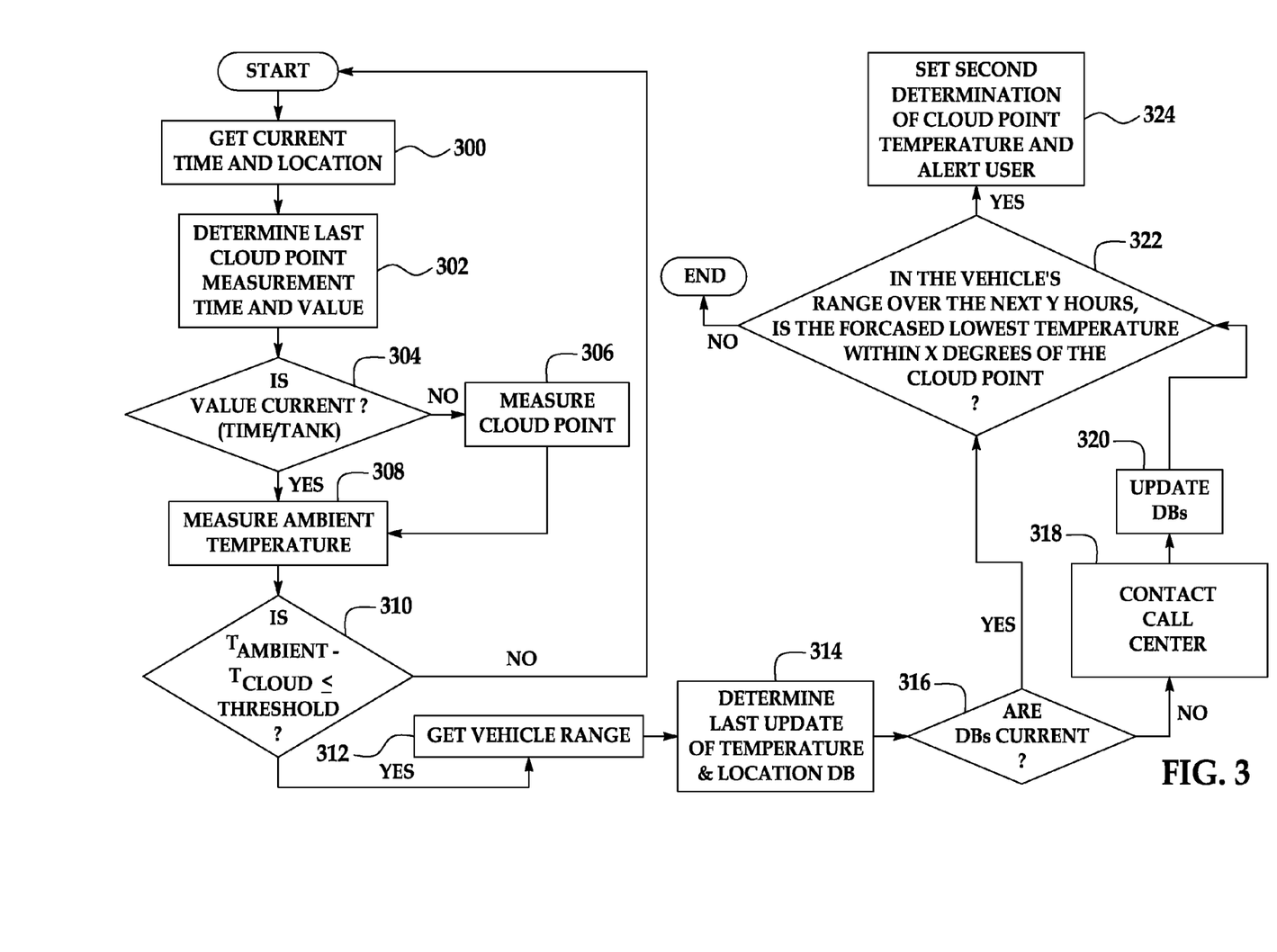
FIG. 3 is a logic diagram illustrating an example of the method for receiving and responding to information about diesel fuel cloud point in the vehicle fuel system.

FIG. 3 shows a logic diagram which illustrates the steps of how the telematics unit 114, the cloud point monitoring device 210, the GPS device 132 and the driver information center display 170 work together to gather and process information which makes it possible for the telematics unit 114 to alert the vehicle user of possible cloud point problems, either currently or within a given time in the near future.

In an example, before the telematics unit 114 transmits the in-vehicle alert about the cloud point of the fuel, telematics unit 114 receives the current time and vehicle location, as shown at reference numeral 300). This information may be received by the telematics unit 114 from the GPS device 132. In some instances, the then-current time is received from an in-vehicle real time clock (not shown).

The telematics unit 114 also receives the last cloud point measurement time and value, as shown at reference numeral 302, or measures the then-current cloud point, as shown at reference numeral 306. If the system 100 is configured so that the telematics unit 114 receives the last cloud point measurement, such information is transmitted from the memory 130 or the call center 108 (which may store such data in the vehicle user's profile). In this example, the telematics unit 114 will generally determine whether the last cloud point measurement is current, as shown at reference numeral 304. The telematics unit 114 may be configured with a predetermined time period (e.g., 60 minutes, 1 minute, etc.), and if the time at which the last cloud point measurement was taken has exceeded this predetermined time period, the cloud point is measured, as shown at reference numeral 306, so that a current measurement is available. However, if the last cloud point measurement has not exceeded this predetermined time period, the last measurement may be used in the remainder of the method and thus the cloud point need not be measured again. For example, if the last measurement was taken 30 minutes ago, and the predetermined time period is 60 minutes, the information from the last measurement is current enough to be used.

As shown at reference numeral 304, determining whether the last cloud point value is current may take into account, in addition to the time, the last refueling of the fuel tank. The telematics unit 114 is configured to recognize and record (in memory 130) the occurrence of a refueling event. As such, the telematics unit 114 is able to determine whether a refueling event has occurred since the last cloud point measurement was recorded. If a refueling event has occurred, it is likely that the last cloud point measurement is not current, as cloud point is likely to change with constituents in the fuel. It is to be understood that time alone, or time in combination with the refueling data, may be used to determine whether the last cloud point measurement is current.

As previously mentioned, the telematics unit 114 may also be configured to automatically measure the cloud point, thereby bypassing the steps of receiving and analyzing the last measurement.

Once the telematics unit 114 determines that it has a current cloud point measurement, it receives the current measurement of ambient temperature from a vehicle temperature sensor operatively connected thereto. The ambient temperature is measured to determine whether the algorithm for predicting cloud point conditions should be run.

In order to determine whether the algorithm should be run, the telematics unit 114 calculates whether the current ambient temperature measurement minus the current cloud point measurement is less than or equal to a predetermined threshold level of the cloud point, as shown at reference numeral 310. If the result is greater than the threshold level, the algorithm is not run, and the method ends or starts again (as shown in FIG. 3).

If the result is found to be less than or equal to the threshold, the telematics unit 114 determines a range for the vehicle 102, as shown at reference numeral 312. In an embodiment, the vehicle range is determined from an existing in-vehicle fuel range estimate that is based on the tank level and average fuel economy. The range based upon such data may be calculated via the telematics unit 114. In this example, determining the vehicle range is passive and does not involve the call center 108 or vehicle user.

In other example, the range is equivalent to the amount of time and/or the approximate number of miles that the user plans to drive during the particular outing. Upon recognizing that the ambient temperature exceeds or falls below the threshold, the telematics unit 114 may signal the call center 108 to contact the vehicle user and inquire about his/her expected range. Upon receiving such information from the user, the call center 108 may send a data transmission with such information to the telematics unit 114. Otherwise, the telematics unit 114 may be configured so that it can inquire about the user's expected range. In this example, determining the vehicle range is active and involves the call center 108 and/or the vehicle user.

After receiving or determining the vehicle range, the telematics unit 114 may retrieve information pertaining to temperature and vehicle location from its on-board database/memory 130. The telematics unit 114 receives the temperature measurement and location, and if the information is current (reference numerals 314 and 316), proceeds with running the algorithm for determining whether the user should be alerted regarding cloud point conditions. It is to be understood that the current information from the on-board memory 130 may be used by the telematics unit 114 to predict the lowest forecasted temperature for the vehicle's range within a predetermined amount of time.

In the event that the in-vehicle database 130 is not current, the telematics unit 114 contacts the call center 108 inquiring about the ambient temperature and the vehicle location, as shown at reference numeral 318. The call center 108 sends the most recent information to the telematics unit 114, which updates the on-board database/memory 130 (reference numeral 320).

If or once the on-board database 130 is current, the telematics unit 114 predicts (based on previous temperature measurements and other conditions sensed by on-board sensors 158), or the call center 108 sends, the weather forecast to the telematics unit 114 for the vehicle range. Via an algorithm, the telematics unit 114 determines if the lowest forecasted temperature within the vehicle range is within a predetermined number of degrees of the cloud point, as shown at reference numeral 322. The predetermined number of degrees may be any desirable number, and is generally far enough from the cloud point such that a user may be warned prior to encountering complications that may result when the fuel reaches its cloud point. When the lowest forecasted temperature is within the predetermined number of degrees, the telematics unit 114 transmits a signal to the display 170 to warn the vehicle user that the fuel is reaching cloud point or could reach cloud point within a given time period. In addition to being displayed, the telematics unit 114 may issue an audible alarm within the vehicle.

Figure 4:
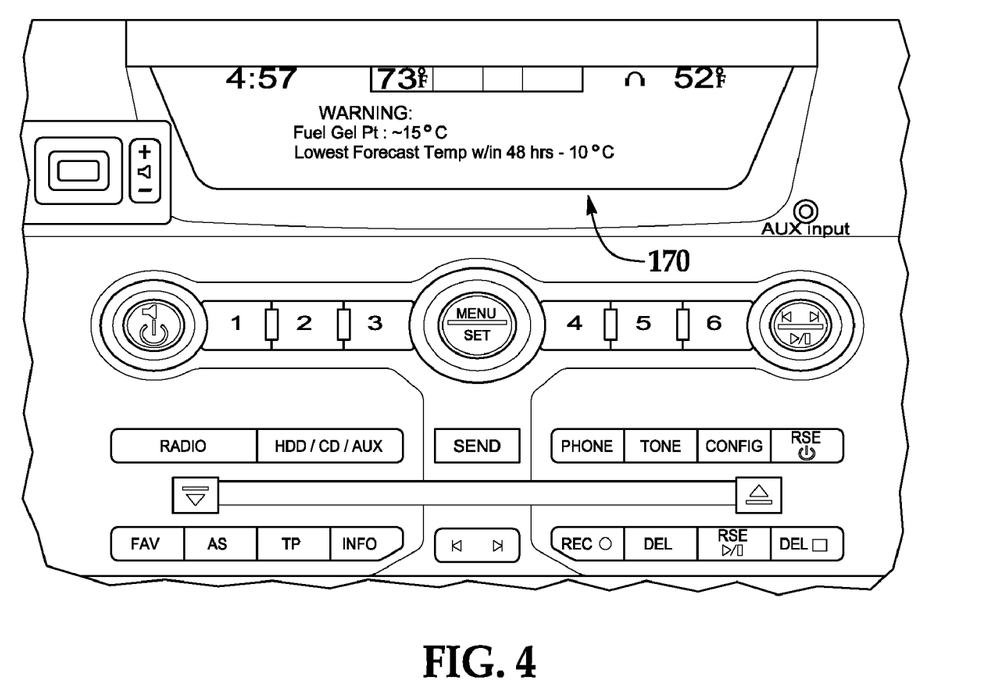
FIG. 4 is a semi-schematic diagram depicting a radio head display displaying a warning.

FIG. 4 illustrates a driver information center display 170 (which in this example is also the radio display) showing an example of a warning or alert that is issued to the user via an in-vehicle display 170.

The telematics unit 114 is able to combine up-to-the-minute information about cloud point with the weather information. As such, the telematics unit 114 is able to keep the user apprised when cloud point is likely to be reached.

Figure 5:
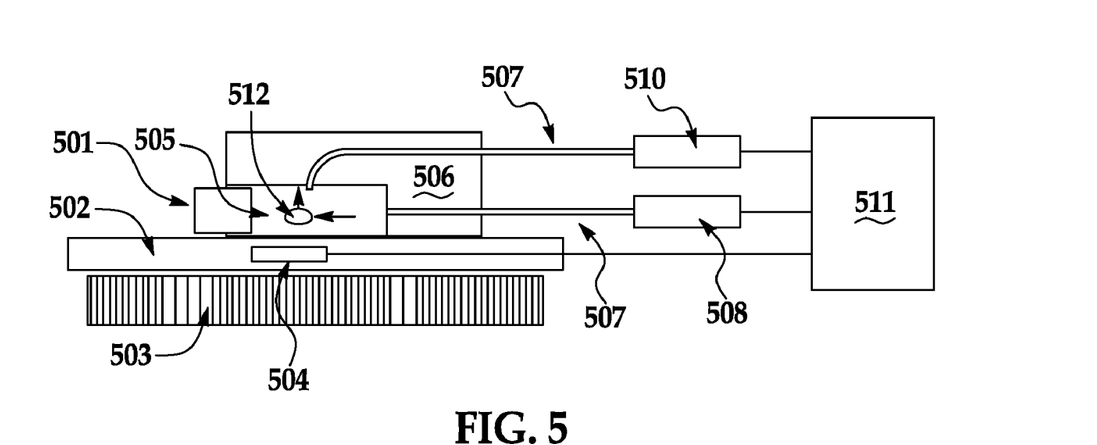
FIG. 5 is a schematic view of an example configuration of the cloud point monitoring device.

An example of the present disclosure incorporates a cloud point monitoring device 210 as shown in FIG. 5, which is similar to the cloud point monitoring device disclosed in U.S. Pat. No. 6,966,692 (Tsang et al.) assigned to Phase Technology, Richmond, Calif., incorporated herein by reference. The device can be operatively connected to the telematics unit 114 of the vehicle 102, as mentioned hereinabove. The cloud point monitoring device 210 accurately measures the cloud point of the diesel fuel in the vehicle 102. The cloud point monitoring device 210 is generally small enough such that the device 210 can be placed securely in a fuel system (e.g., fuel line, fuel tank or fuel filter) of a vehicle 102. In one example of the cloud point monitoring device 210, means to detect the transition between liquid and solid phases, means to cool the fuel to achieve phase transition, and means to obtain the data and send it to the telematics unit 114 are included.

FIG. 5 illustrates one non-limiting example of the cloud point monitoring device 210. In this example, the cloud point monitoring device 210 generally includes a main volume 501, a thermal conductive surface 502, a cooler 503, a temperature sensor 504, a detection volume 505, a detection wall unit 506, a fiber optic cable 507 for transmitting light, lighter emitter 508, light detector 510, and a data acquisition and control unit 511. As shown in FIG. 5, the cloud point monitoring device 210 is located within a fuel flow to a diesel engine. This location enables the fluid to flow and fill the main volume 501 and the detection volume 505 of the cloud point monitoring device 210. It is believed that the cloud point monitoring device 210 may be positioned where the fluid flow is considered to be critical to the successful operation of the diesel engine. Such a location may be inside the fuel tank, inside any portion of the fuel transfer line, or between the tank and engine.

The thermal conductive surface 502 is placed in contact with the cooler 503 to induce the forming and melting of wax crystals. The cooler 503 is generally used to control the temperature of the thermal conductive surface 502, and thus the temperature of the fuel near the thermal conductive surface 502. The fuel is cooled when the thermal transfer of cooling by the cooler 503 to the thermal conductive surface 502 is increased. On the contrary, the fuel is warmed when the thermal transfer of cooling by the cooler 503 to the thermal conductive surface 502 is decreased. A temperature sensor 504 may be embedded in the thermal conductive surface 502 which continuously monitors the temperature of the diesel fuel in close proximity to the thermal conductive surface 502. In one example, the thermal conductive surface 502, the cooler 503 and the temperature sensor 504 are incorporated into a single device (not shown).

The formation and melting of wax crystals occurs within the detection volume 505. The detection wall unit 506 within the main volume 501 bounds the detection volume 505 at the top and one side, and bounds the main volume 501 at the bottom by the thermal conductive surface 502. The thermal conductive surface 502 thermally conditions the area of fuel of the detection volume 505. Diesel fuel is able to freely flow in and out of the detection volume 505 via the remaining three open sides. These sides are generally not restricted by the detection wall unit 506.

It is believed that the thermal conductive surface 502 works more efficiently when it has an orientation such that the wax crystals formed with cooling are kept within the detection volume 505. In one example, the thermal conductive surface 502 is positioned horizontally, which allows the wax crystals to fall towards the thermal conductive surface 502 due to gravity.

An optical detection assembly is formed by the single unit combination of the thermal conductive surface 502, the detection wall unit 506, the fiber optic light cables 507, the lighter emitter 508, and the light detector 510. With a first cable of the fiber optic cables 507, light from the light emitter 508 is transmitted into the detection volume 505. That first fiber optic cable is the emitter optic. A second of the fiber optic cables 507 transmits scattered light due to interaction with wax crystals in the detection volume 505 to the light detector 510. That second fiber optic cable is the receiver optic. Light from the light emitter 508 is shown in FIG. 5 as it shines into the detection volume 505 from the side of the detection wall unit 506. As shown in FIG. 5, the second fiber optic cable 507 located in the detection wall unit 506 at the top of the detection volume 505 collects the scattered light.

Temperature sensor 504 and light detector 510 data is collected by a data acquisition and control unit 511. Such information is used to control the cooling and warming rates of the thermal conductive surface 502 and to analyze the collected data. A microprocessor having the necessary software and hardware is used in the data acquisition and control unit 511 for this purpose.

In order to determine the cloud point of the fuel, the thermal conductive surface 502 cools the fuel within the detection volume 505 until wax crystals form. Then the fuel is warmed until all the wax crystals melt. According to a standard test method established by the American Society of Testing and Materials (ASTM), the fuel is then cooled again at a slower rate than before. According to the test method, the cloud point is defined as the temperature at which the wax crystals begin to form during this slow-cooling step. According to this method, the quick determination of cloud point is first obtained by scanning a wide temperature region using a fast cooling rate. This allows the identification of an approximate cloud point. The second test then repeats the determination using a slower cooling rate over a much narrower temperature range. It is to be understood that the slow cooling step is often omitted because an approximate cloud point is suitable for the method disclosed herein.

As previously mentioned, it may be desirable to utilize a relatively small cloud point monitoring device 210. In an example, the thermal conductive surface 502 in FIG. 5 measures approximately 1 cm square. A thermally conductive material, such as copper or aluminum may be used as the material for the thermal conductive surface 502. Polishing the thermal conductive surface 502 may be used to achieve a high degree of reflectivity to increase the intensity of scattered light created by the wax crystals and registered by the light detector 510. Small coolers 503 may also be used, non-limiting examples of which include stirling coolers, pulse-tube coolers, or thermoelectric coolers. Such coolers 503 are so miniaturized and lightweight that it becomes feasible and convenient to mount them inside a fuel tank or fuel line.

While several embodiments have been described in detail, it will be apparent to those skilled in the art that the disclosed embodiments may be modified. Therefore, the foregoing description is to be considered exemplary rather than limiting.

The invention claimed is:

1. A method for receiving in-vehicle information regarding diesel fuel cloud point condition, the method comprising:
   establishing communication between a telematics unit in a vehicle and i) a global positioning system device, ii) a database at a call center or operatively connected to the telematics unit, and iii) a cloud point monitoring device in the vehicle;
   receiving, at the telematics unit from at least one of i, ii, iii or an in-vehicle sensor, information pertaining to vehicle location, cloud point, and ambient temperature;
   determining from the information whether fuel in a fuel system of the vehicle is reaching cloud point or will reach cloud point within a given time period; and
   transmitting an in-vehicle alert when the fuel in the vehicle fuel system is reaching cloud point or will reach cloud point within a given time period.

2. The method of claim 1 wherein a driver information center audibly or visually delivers the in-vehicle alert.

3. The method of claim 1 wherein receiving the information includes:
   receiving a current time and vehicle location at the telematics unit;
   receiving a cloud point measurement time and temperature at the telematics unit; and
   receiving a current measurement of the ambient temperature at the telematics unit.

4. The method of claim 3, further comprising:
   determining whether the ambient temperature minus the cloud point temperature is less than or equal to a predetermined threshold; and
   if the ambient temperature minus the cloud point temperature is less than or equal to the cloud point temperature threshold, than determining whether the fuel in the vehicle fuel system is reaching cloud point or can reach cloud point within a given time period is accomplished by:
      obtaining a vehicle range; and
      recognizing that a lowest forecasted temperature within the vehicle's range is within a predetermined number of degrees of the cloud point.

5. The method of claim 3 wherein receiving the cloud point measurement time and temperature at the telematics unit includes:
   retrieving a stored cloud point measurement time and temperature from a memory in the telematics unit;
   recognizing that the stored cloud point measurement time and temperature is not current; and
   measuring a current cloud point temperature via an on-board sensor configured to measure cloud point.

6. The method of claim 3 wherein receiving the cloud point measurement time and temperature at the telematics unit includes:
   retrieving a stored cloud point measurement time and temperature from a memory in the telematics unit; and
   recognizing that the stored cloud point measurement time and temperature is current.

7. The method of claim 3, further comprising:
   receiving a last update of ambient temperature and vehicle location from the database operatively connected to the telematics unit; and
   if the last update is not current, contacting the call center database to obtain information related to then-current ambient temperature and then-current vehicle location.

8. The method of claim 1 wherein the in-vehicle alert is visually displayed on a display of a driver information center, and wherein the display is an in-vehicle radio display, an infotainment center display, an audio component display, or an in-vehicle display separate from at least one of the in-vehicle radio display, the infotainment center display, or the audio component display.

9. A system for generating in-vehicle information regarding a diesel fuel cloud point condition, the system comprising:
   a telematics unit in a vehicle;
   a global positioning system device configured to transmit vehicle location information to the telematics unit;
   a database, operatively connected to the telematics unit or at a call center, configured to transmit stored information to the telematics unit;
   a cloud point monitoring device in the vehicle configured to measure a cloud point temperature and transmit such measurement to the telematics unit; and
   a driver information center in the vehicle configured to receive an alert when the telematics unit recognizes, based on the received information and measurements, that the fuel in a fuel system of the vehicle is reaching the cloud point or can reach cloud point within a given time period.

10. The system of claim 9 wherein:
   the global positioning system device is configured to transmit a current time and vehicle location to the telematics unit;
   the cloud-point monitoring device is configured to transmit a current cloud point temperature reading to the telematics unit; and
   a temperature sensor of the vehicle is configured to transmit a current measurement of ambient temperature to the telematics unit.

11. The system of claim 10 wherein the telematics unit is further configured to:
   determine whether the current ambient temperature minus the current cloud point temperature is less than or equal to a predetermined threshold;
   if the current ambient temperature minus the current cloud point temperature is less than or equal to the cloud point temperature threshold, than;
   obtain a vehicle range; and
   recognize that a lowest forecasted temperature within the vehicle's range is within a predetermined number of degrees of the cloud point temperature.

12. The system of claim 9 wherein the driver information center includes a display configured to visibly display the alert.

13. The system of claim 12 wherein the display of the driver information center is an in-vehicle radio display, an infotainment center display, an audio component display, or an in-vehicle display separate from at least one of the in-vehicle radio display, the infotainment center display and the audio component display.

* * * * *